(12) United States Patent
Lee (10) Patent No.: US 7,496,227 B2
(45) Date of Patent: Feb. 24, 2009

(54) METHOD OF CONTROLLING DIGITAL IMAGE PROCESSING APPARATUS TO EFFECTIVELY DISPLAY HISTOGRAM AND DIGITAL IMAGE PROCESSING APPARATUS USING THE METHOD

(75) Inventor: Jong-hwan Lee, Seoul (KR)

(73) Assignee: Samsung Techwin Co., Ltd., Changwon (KR)

( * ) Notice: Subject to any disclaimer, the term of this patent is extended or adjusted under 35 U.S.C. 154(b) by 653 days.

(21) Appl. No.: 11/196,027

(22) Filed: Aug. 3, 2005

(65) Prior Publication Data

US 2006/0245647 A1    Nov. 2, 2006

(30) Foreign Application Priority Data

Apr. 29, 2005    (KR) ............... 10-2005-0036071

(51) Int. Cl.
*G06K 9/00* (2006.01)
(52) U.S. Cl. ....................................... 382/168
(58) Field of Classification Search ........... 382/162, 382/167, 168, 172, 312, 313; 348/234, 239, 348/345, 362; 358/1.2, 3.26, 518–522, 527; 396/89, 121, 379
See application file for complete search history.

(56) References Cited

U.S. PATENT DOCUMENTS

| | | | |
|---|---|---|---|
| 7,305,127 B2 * | 12/2007 | Wells | 382/168 |
| 7,305,151 B2 * | 12/2007 | Shiiyama | 382/305 |
| 7,327,493 B2 * | 2/2008 | Yamada et al. | 358/1.9 |
| 7,327,879 B2 * | 2/2008 | Nako et al. | 382/167 |
| 7,358,988 B1 * | 4/2008 | Konishi et al. | 348/222.1 |
| 2004/0119876 A1 | 6/2004 | Ohmori et al. | |
| 2004/0125220 A1 | 7/2004 | Fukuda et al. | |

* cited by examiner

*Primary Examiner*—Jose L Couso
(74) *Attorney, Agent, or Firm*—Drinker Biddle & Reath LLP (57) ABSTRACT

Provided is a method of controlling a digital image processing apparatus that displays a histogram showing a number of display cells for each gradation of a displayed image according to the needs of a user. The method includes: displaying a partial area window of a shape selected by a user; moving the partial area window or changing a size of the partial area window according to a manipulation by the user; and displaying the histogram for an entire area of the displayed image and expressing an average brightness value of an area of a current partial area window in the histogram if a confirmation signal for the partial area window is input from by user.

20 Claims, 6 Drawing Sheets

METHOD OF CONTROLLING DIGITAL IMAGE PROCESSING APPARATUS TO EFFECTIVELY DISPLAY HISTOGRAM AND DIGITAL IMAGE PROCESSING APPARATUS USING THE METHOD

BACKGROUND OF THE INVENTION

This application claims the priority of Korean Patent Application No. 10-2005-0036071, filed on Apr. 29, 2005, in the Korean Intellectual Property Office, the disclosure of which is incorporated herein in its entirety by reference.

1. Field of the Invention

The present invention relates to a method of controlling a digital image processing apparatus and a digital image processing apparatus using the method, and more particularly, to a method of controlling a digital image processing apparatus that displays a histogram showing the number of display cells for each gradation of a displayed image according to the needs of a user, and a digital image processing apparatus, for example, a digital camera or a camera-phone, using the method.

2. Description of the Related Art

A conventional image processing apparatus is disclosed in U.S. patent Publication No. 119,876 entitled "Method of Notification of Inadequate Picture Quality", filed in 2004. The conventional image processing apparatus displays a histogram showing the number of cells for each gradation of a displayed image according to the needs of a user. However, since the conventional digital image processing apparatus displays a histogram only for the entire area of the displayed image, the user cannot effectively use the histogram.

SUMMARY OF THE INVENTION

The present invention provides a method of controlling a digital image processing apparatus, which enables a user to effective use a histogram, and a digital image processing apparatus using the method.

According to an aspect of the present invention, there is provided a method of controlling a digital image processing apparatus that displays a histogram showing a number of display cells for each gradation of a displayed image according to the needs of a user. The method includes: displaying a partial area window of a shape selected by a user; moving the partial area window or changing a size of the partial area window according to a manipulation by the user; and displaying the histogram for an entire area of the displayed image and expressing an average brightness value of an area of a current partial area window in the histogram if a confirmation signal for the partial area window is input by the user.

According to another aspect of the present invention, there is provided a digital image processing apparatus including: a display; and a controller that displays a histogram showing a number of display cells for each gradation of a displayed image on the display according to the needs of a user, wherein the controller performs a controlling method including: displaying a partial area window of a shape selected by a user; moving the partial area window or changing a size of the partial area window according to a manipulation by the user; and displaying the histogram for an entire area of the displayed image and expressing an average brightness value of an area of a current partial area window in the histogram if a confirmation signal for the partial area window is input by the user.

According to the method of controlling the digital image processing apparatus and the digital image processing apparatus using the method, an average brightness value of an area of a partial area window which can be moved by a user using functional buttons is presented in a histogram. Accordingly, the user can view the average brightness of a desired partial area in the gradation distribution of an entire area. The user may move a partial area window of a desired shape to an area where a main subject is and thus view the average brightness of the main subject in the gradation distribution of the entire area. Therefore, the user can obtain a more precise image using the histogram effectively.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
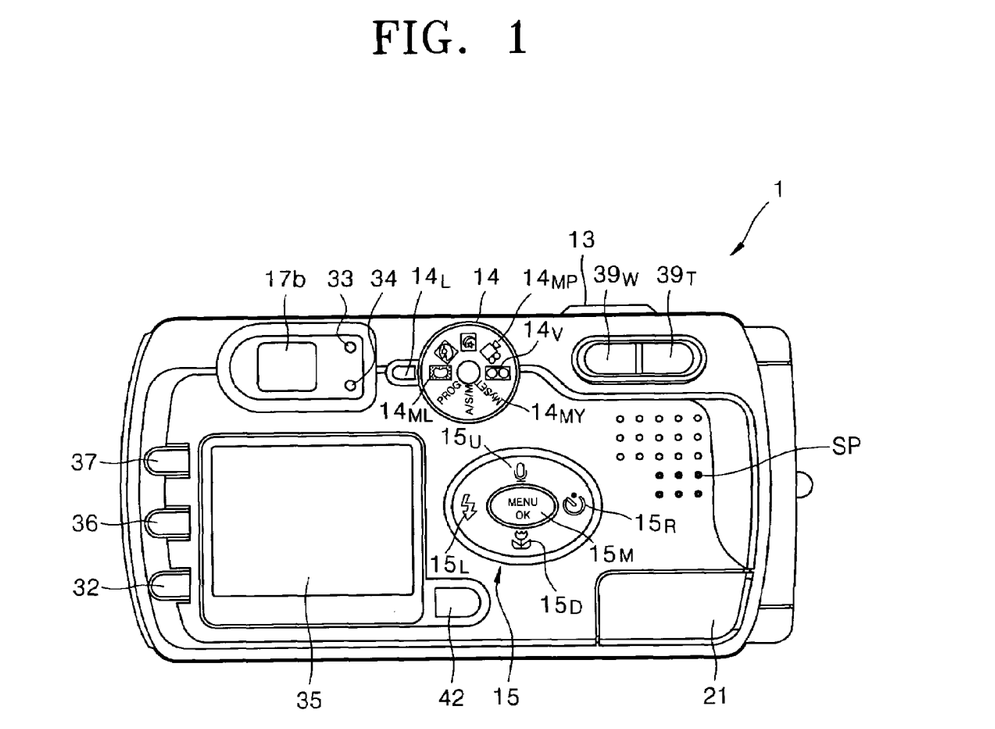
FIG. 1 is a perspective view illustrating the back of a digital camera according to an embodiment of the present invention.

Referring to FIG. 1, the back part of a digital camera 1 as a digital image processing apparatus according to the present invention includes a shutter release button 13, a mode dial 14, a mode indicating lamp $14_L$, functional buttons 15, a manual focus/delete button 36, a manual adjust/reproduce/terminate button 37, a reproducing mode button 42, a speaker SP, a monitor button 32, an automatic focusing lamp 33, a viewfinder 17b, a flash standby lamp 34, a color LCD panel 35, a wide-angle zoom button $39_W$, a telephoto-zoom button $39_T$, and an external interface unit 21.

The shutter release button 13 has two levels. In other words, referring to FIG. 3, after operating the wide-angle zoom button $39_W$ and the telephoto-zoom button $39_T$, when a user lightly depresses the shutter release button 13 to a first level, a first level signal SH1 from the shutter release button 13 is turned on. When the user fully depresses the shutter release button 13 to a second level, a second level signal SH2 from the shutter release button 13 is turned on.

The mode dial 14 is used for selecting the operating modes of the digital camera 1, such as a moving-image photographing mode $14_{MP}$, a synthesized photographing mode $14_{ML}$, a personal loading mode $14_{MY}$, or a recording mode $14_V$.

The synthesized photographing mode $14_{ML}$ is for synthesizing an input image and a supporting image. The personal loading mode $14_{MY}$ is an operating mode where a user loads photograph-taking settings stored in a memory card as a recording medium.

The functional buttons 15 are used for operating specific functions of the digital camera 1 and the functional buttons 15 are also used as control buttons to manage the movement of an active cursor on the menu screen of the color LCD panel 35. The functional buttons 15 include a self-timer/right button $15_R$, a flash/left button $15_L$, a macro/down button $15_D$, a voice-memo/up button $15_U$, and a menu/select-confirm button $15_M$.

The manual adjust/reproduce/terminate button 37 is used for manual adjustment of specific conditions. In the reproducing mode, when the user presses the manual adjust/reproduce/terminate button 37, a selected moving-image file may be reproduced or its reproduction may be terminated.

Figure 2:
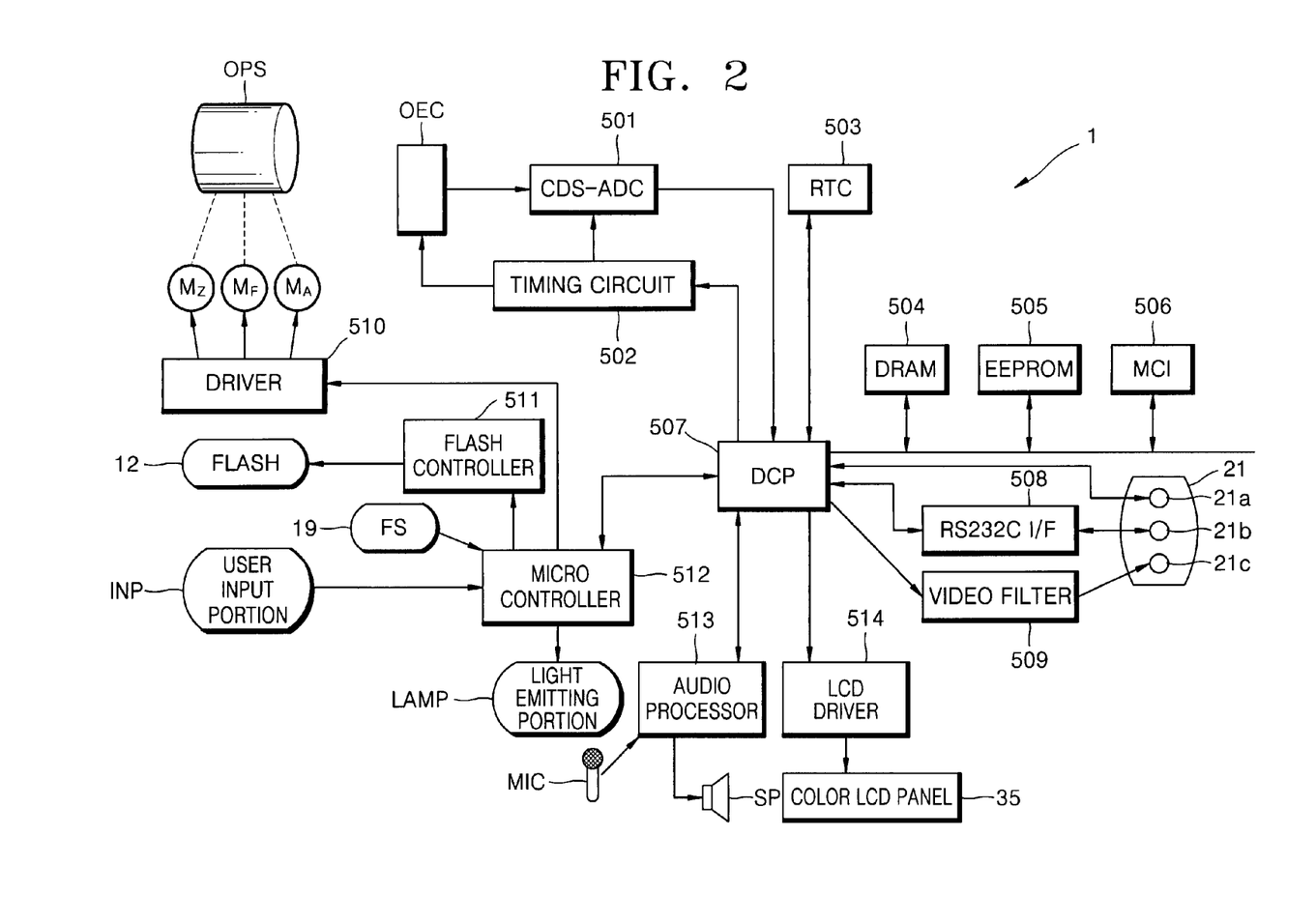
FIG. 2 is a schematic diagram of the entire configuration of the digital camera of FIG. 1.

The manual focus/delete button 36 is used for manual focusing or deleting in the photographing mode. The monitor button 32 is used for controlling the operation of the color LCD panel 35. The reproducing mode button 42 is used for switching between the reproducing mode and the preview mode. The automatic focusing lamp 33 operates when a focus is well adjusted. The flash standby lamp 34 operates when a flash 12 of FIG. 2 is in a standby mode. The mode indicating lamp $14_L$ indicates a selection mode of the mode dial 14.

FIG. 2 is a schematic diagram of the entire configuration of the digital camera 1 of FIG. 1. The configuration and operation of the digital camera 1 of FIG. 1 will now be described with reference to FIGS. 1 and 2.

An optical system (OPS) including a lens unit and a filter unit optically processes light from a subject. The lens unit of the OPS includes a zoom lens, a focal lens, and a compensation lens.

When a user presses the wide angle-zoom button $39_W$ or the telephoto-zoom button $39_T$ included in a user input portion (INP), a signal corresponding to the wide angle-zoom button $39_W$ or the telephoto-zoom button $39_T$ is relayed to a micro-controller 512. The micro-controller 512 controls a driver 510, thereby activating a zoom motor $M_Z$ for moving the zoom lens.

In an automatic focusing mode, a main controller built into a digital camera processor (DCP) 507 controls the driver 510 through the micro-controller 512, thereby driving a focus motor $M_F$. Accordingly, when the focal lens is moved, the position of the focal lens, for example, a number of driving steps of the focus motor $M_F$, having a largest high frequency component of an image signal is set.

The compensation lens in the lens unit of the OPS is not separately operated because the compensation lens compensates for the entire refractive index. Reference numeral $M_A$ indicates a motor for driving an aperture (not shown).

An optical low pass filter included in the filter unit of the OPS eliminates high frequency optical noise. An infrared cut filter included in the filter unit of the OPS blocks the infrared component of incident light.

A photoelectric conversion unit (OEC) of a charge coupled device or a complementary metal oxide semiconductor (CMOS) converts light from the OPS into an analog electrical signal. Here, the DCP 507 controls a timing circuit 502 to control the operations of the OEC and a correlation-double-sampler-and-analog-to-digital converter (CDS-ADC) 501.

The CDS-ADC 501 processes an analog signal from the OEC, eliminates high frequency noise therefrom, adjusts an amplitude thereof, and then converts the analog signal into a digital signal.

A real time clock (RTC) 503 provides time information to the DCP 507. The DCP 507 processes the digital signal from the CDS-ADC 501 and generates a digital image signal composed of brightness and chromaticity.

A light emitting portion (LAMP) is operated by the micro-controller 512 in response to a control signal generated by the DCP 507 including the main controller. The light emitting portion (LAMP) includes a self-timer lamp (not shown), the automatic focusing lamp 33, the mode indicating lamp $14_L$, and the flash standby lamp 34. The user input portion INP includes the shutter release button 13, the mode dial 14, the functional buttons 15, the monitor button 32, the manual focus/delete button 36, the manual adjust/reproduce/terminate button 37, the wide angle-zoom button $39_W$, and the telephoto-zoom button $39_T$.

A dynamic random access memory (DRAM) 504 temporarily stores a digital image signal from the DCP 507. An electrically erasable and programmable read only memory (EEPROM) 505 stores algorithms and setting data. A user's memory card is inserted into or removed from a memory card interface 506. The digital image signal from the DCP 507 is input to an LCD driver 514, thereby displaying an image on the color LCD panel 35.

The digital image signal from the DCP 507 can be transmitted via a universal serial bus (USB) connector $21a$ or via an RS232C interface 508 and an RS232C connector $21b$ for serial communications. The digital image signal from the DCP 507 can also be transmitted via a video filter 509 and a video output unit $21c$ as a video signal.

An audio processor 513 can relay sound from a microphone MIC to the DCP 507 or to speaker SP. In addition, the audio processor 513 can output an audio signal from the DCP 507 to the speaker SP. The micro-controller 512 controls the operation of a flash controller 511 in response to a signal from a flash-brightness sensor (not shown), thereby driving the flash 12.

A main algorithm of the DCP 507 of FIG. 2 will be now described with reference to FIGS. 1 through 3.

When power is applied to the digital camera 1, the DCP 507 is initialized (S31). After the initialization (S31), the DCP 507 performs the preview mode (S32). In the preview mode, an input image is displayed on the color LCD panel 35.

When a user lightly depresses the shutter release button 13 to the first level and the first level signal SH1 from the shutter release button 13 is turned on (S33), the DCP 507 performs a current photographing mode (S34).

When INP generated signals corresponding to a setting mode are input (S35), the setting mode for setting an operating condition in response to the input signals from the INP is performed (S36). When a termination signal is not generated, the DCP 507 continues to perform the following operations (S37).

When a signal is generated by the reproducing mode button 42 in the user input portion INP (S38), the reproducing mode is performed (S39). In the reproducing mode, the DCP 507 performs a reproduction operation in response to the input signals from the user input portion INP. When the reproducing mode is terminated, the operations described above are repeated.

Figure 3:
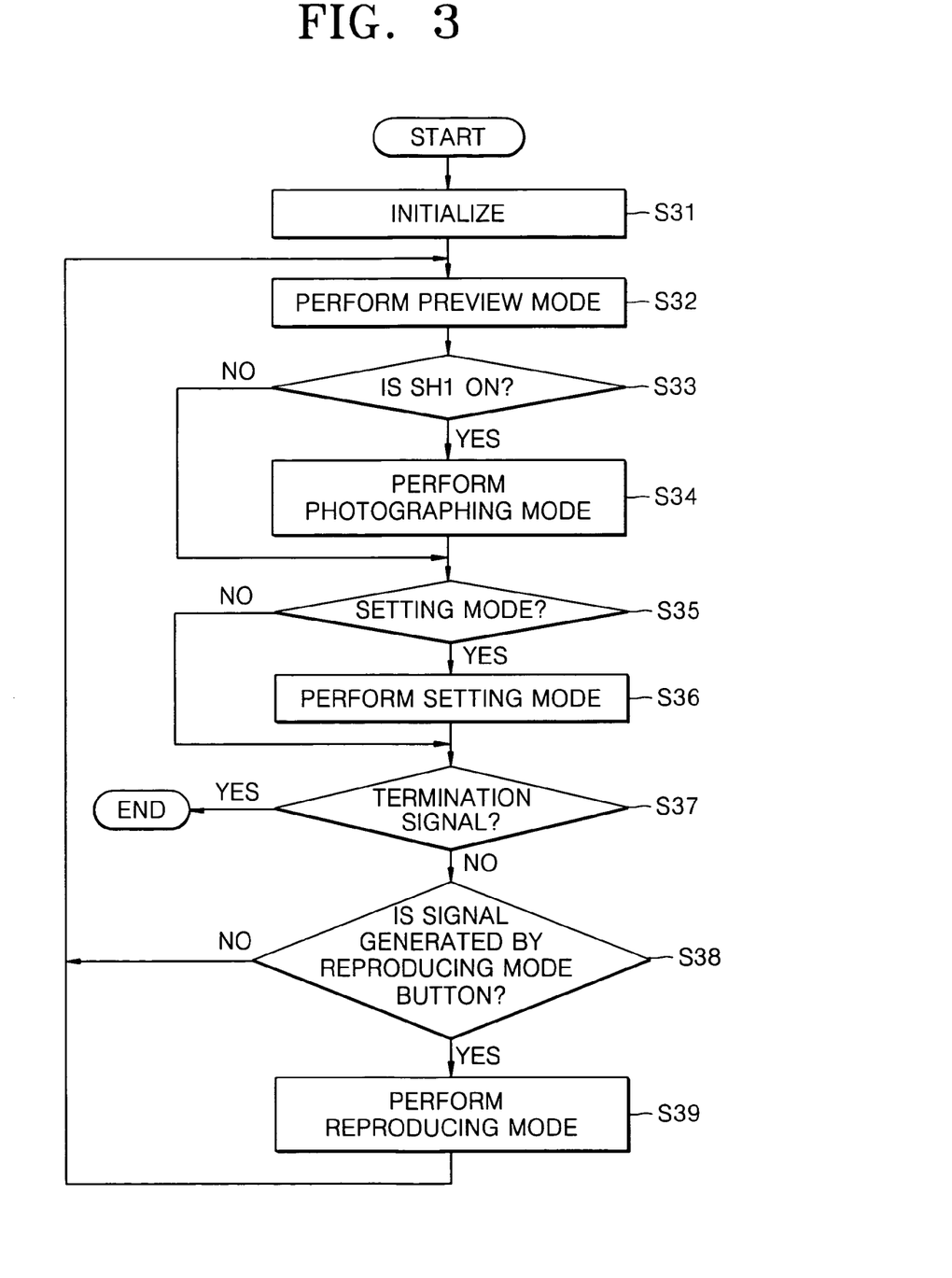
FIG. 3 is a flowchart illustrating a main algorithm of a digital camera processor (DCP) illustrated in FIG. 2.

If the user sets a histogram display function in the setting mode (S36), a histogram display algorithm is additionally performed in the preview mode (S32) or the reproducing mode (S39) of FIG. 3. Here, a histogram denotes a distribution chart showing the number of display cells for each gradation of an image displayed on the color LCD panel 35.

Figure 4:
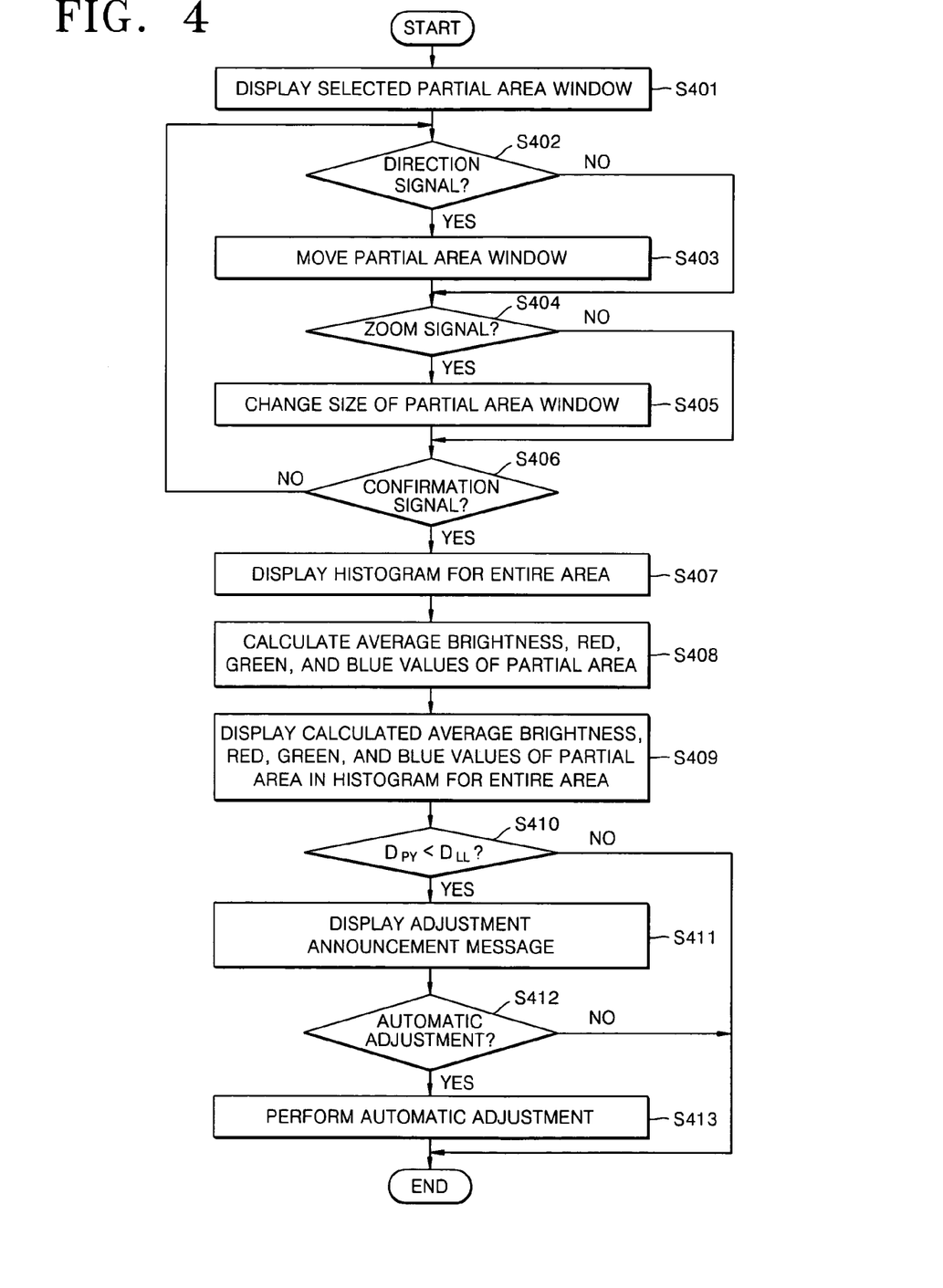
FIG. 4 is a flowchart illustrating a histogram display algorithm performed in a preview mode or a reproducing mode when a histogram display function is set in a setting mode of FIG. 3.
Figure 5:
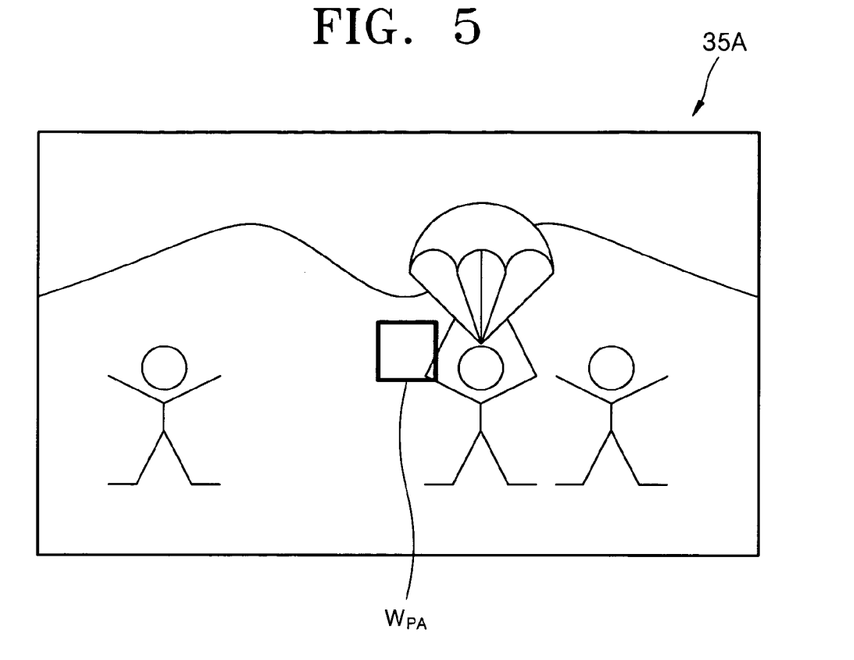
FIG. 5 is an example of a screen displayed after operation S401 of FIG. 4 is performed.
Figure 6:
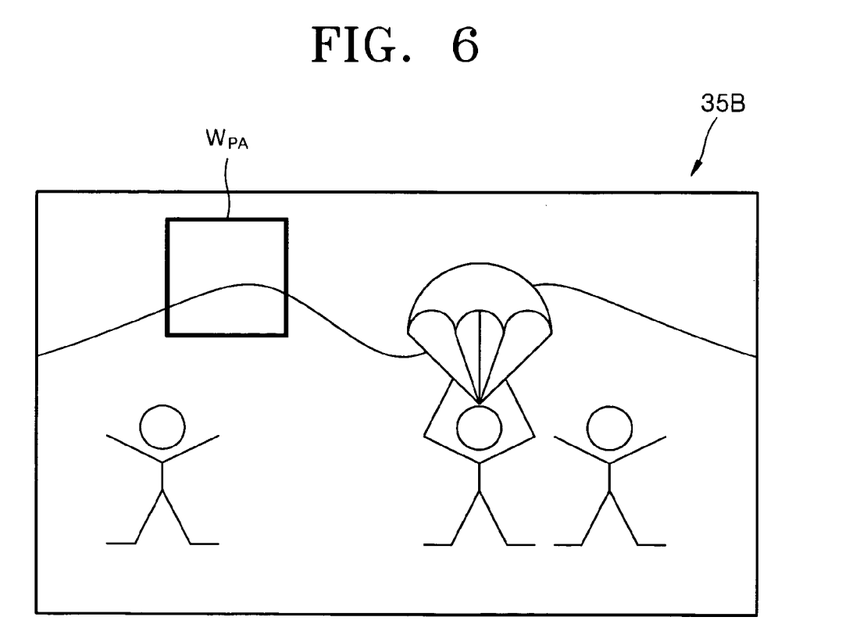
FIG. 6 is an example of a screen displayed after operations S402 through S405 of FIG. 4 are performed.
Figure 7:
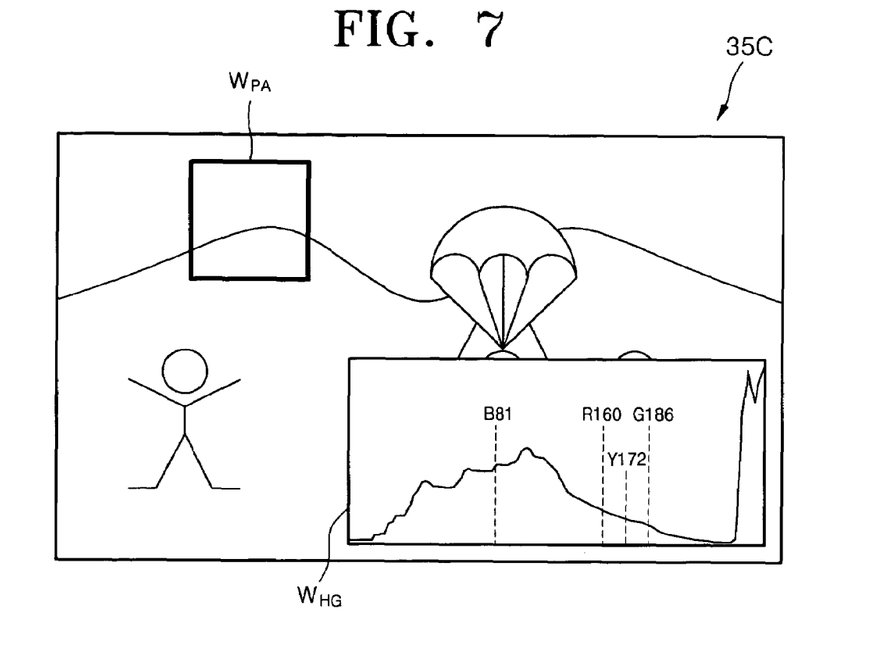
FIG. 7 is an example of a screen displayed after operations S407 through S409 of FIG. 4 are performed.
Figure 8:
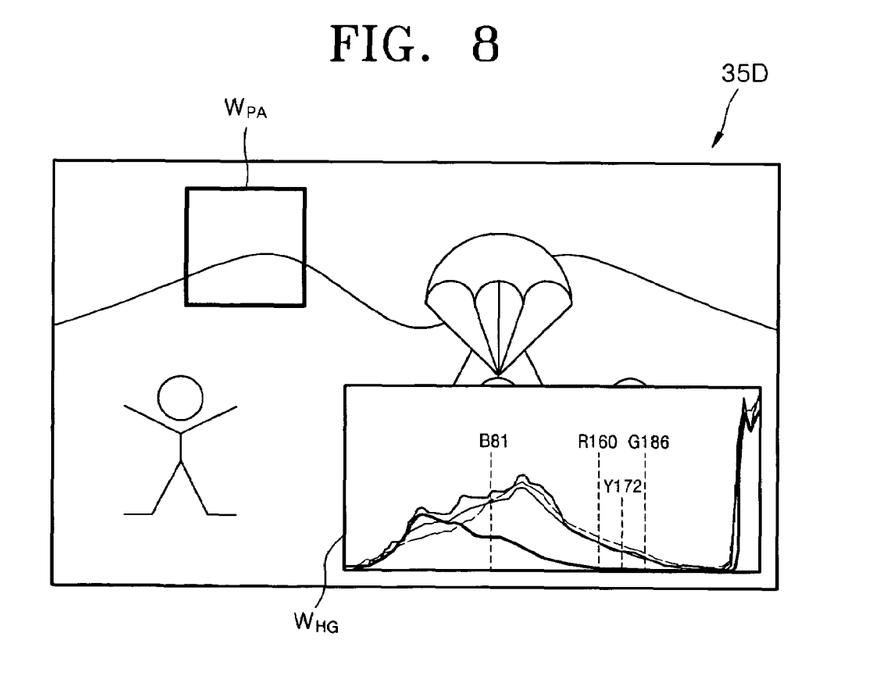
FIG. 8 is another example of a screen displayed after operations S407 through S409 of FIG. 4 are performed.

FIG. 4 is a flowchart illustrating the histogram display algorithm. FIG. 5 is an example of a screen displayed after operation S401 of FIG. 4 is performed. FIG. 6 is an example of a screen displayed after operations S402 through S405 of FIG. 4 are performed. FIG. 7 is an example of a screen displayed after operations S407 through S409 of FIG. 4 are performed. FIG. 8 is another example of a screen displayed after operations S407 through S409 of FIG. 4 are performed.

Reference numerals 35A through 35D in FIGS. 5 through 8 respectively indicate screens displayed on the color LCD panel 35 and the LCD driver 514 illustrated in FIG. 2. $W_{PA}$ indicates a partial area window of a shape selected by a user when the user sets the histogram display function in the setting mode (S36). $W_{HG}$ indicates a histogram window.

The histogram display algorithm additionally performed in the preview mode (S32) or the reproducing mode (S39) of FIG. 3 when the histogram display function is set in the setting mode (S36) of FIG. 3 will now be described with reference to FIGS. 4 through 8.

The DCP 507 of FIG. 2 displays the partial area window $W_{PA}$ of a shape selected by a user when the user sets the histogram display function in the setting mode (S36) on the color LCD panel 35 of FIG. 2 (S401, see FIG. 5). For example, if a main subject is a face, the user may select a circular partial area window $W_{PA}$. Then, the circular partial area window $W_{PA}$ is displayed.

The DCP 507 moves the partial area window $W_{PA}$ in response to direction signals generated after the user presses the self-timer/right button $15_R$, the flash/left button $15_L$, the macro/down button $15_D$, and the voice-memo/up button $15_U$ (S402 and S403). In addition, the DCP 507 changes the size of the partial area window $W_{PA}$ in response to zoom signals generated after the user presses the wide angle-zoom button $39_W$ and the telephoto-zoom button $39_T$ of FIG. 1 (S404 and S405, see FIGS. 5 and 6). Here, other buttons may be used instead of the wide angle-zoom button $39_W$ and the telephoto-zoom button $39_T$.

In response to a confirmation signal generated after the user presses the menu/select-confirm button $15_M$ (S406), the DCP 507 performs the following operations.

The DCP 507 displays a histogram for an entire area of an image displayed on the color LCD panel 35 in the histogram window $W_{HG}$ (S407). Referring to FIGS. 7 and 8, the histogram window $W_{HG}$ overlaps the displayed image. However, there may be a window (not shown) of the displayed image, which does not overlap the histogram window $W_{HG}$. As described above, a histogram is drawn by the number of display cells for each gradation of an image displayed on the color LCD panel 35.

Next, the DCP 507 calculates an average brightness (Y) value, an average red (R) value, an average green (G) value, and an average blue (B) value of an area of a current partial area window $W_{PA}$ (S408). The average brightness (Y) value denotes an average of "Y" values of the current partial area window $W_{PA}$ when image data is converted from an "RGB" format to a "YUV" format.

Referring to FIG. 7, the DCP 507 indicates positions of gradations in the histogram which respectively correspond to the calculated average brightness (Y) value, the calculated average red (R) value, average green (G) value, and average blue (B) value, for example, Y172, R160, G186, and B81, in dotted lines and displays the calculated average brightness (Y) value, average red (R) value, average green (G) value, and average blue (B) value at their corresponding positions in the histogram (S409).

Accordingly, a user can view the average brightness (Y) value, the average red (R) value, the average green (G) value, and the average blue (B) value of a desired partial area in the gradation distribution of the entire area. As a result, the user can effectively use the histogram and thus obtain a more precise image.

For example, in the preview mode (S32) of FIG. 3, the user may move the partial area window of a desired shape to an area where a main subject is and adjust an exposure compensation value according to the average brightness (Y) value of the main subject in the histogram. In addition, the user may make RGB balance adjustments in the setting mode (S36) of FIG. 3 according to the average red (R) value, the average green (G) value, and the average blue (B) value of the main subject in the histogram.

If a difference $D_{LL}$ between the average brightness (Y) value (172 in FIGS. 7 and 8) of the area of the current partial area window $W_{PA}$ and a set average brightness value exceeds a set upper limit value $D_{PY}$, the DCP 507 displays an adjustment announcement message to make adjustments (S410 and S411). For example, the DCP 507 displays a message such as "The main subject is dark. Please change the photometry mode or set the exposure compensation value to +0.3 EV. Do you prefer automatic adjustment?".

Accordingly, when the user manipulates the functional buttons 15 and generates an automatic adjustment signal, the DCP 507 makes automatic adjustments (S412 and S413). Hence, the user can obtain a desired image more easily using the histogram effectively. In the reproducing mode (S39) of FIG. 3, image data of the entire area and/or the area of the current partial area window $W_{PA}$ can be directly adjusted by a user.

In operation S407, a histogram for the brightness (Y) of the entire area is displayed on the screen 35C of FIG. 7. However, a histogram for the brightness (Y) of the entire area, a histogram for the red (R) value of the entire area, a histogram for the green (G) value of the entire area, and a histogram for the blue (B) value of the entire area are displayed on the screen 35D of FIG. 8. Accordingly, a user can effectively use the histogram and thus obtain a more precise image.

As described above, according to a method of controlling a digital image processing apparatus and a digital image processing apparatus using the method, an average brightness (Y) value of an area of a partial area window which can be moved by a user using functional buttons is presented in a histogram. Accordingly, the user can view the average brightness (Y) of a desired partial area in the gradation distribution of an entire area. The user may move a partial area window of a desired shape to an area where a main subject is and thus view the average brightness (Y) of the main subject in the gradation distribution of the entire area. Therefore, the user can obtain a more precise image using the histogram effectively.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital image processing apparatus that displays a histogram for at least a portion of a displayed image, the method comprising:

displaying in a window, located on a display, a partial area of the displayed image;

changing parameters of the window according to a manipulation by the user; and displaying the histogram for the entire displayed image and expressing an average brightness value in the histogram of the partial area in the window.

2. The method of claim 1, wherein, in the displaying of the histogram, the average brightness value of the partial area in the window is expressed as a position in the histogram.

3. The method of claim 1, wherein, in the displaying of the histogram, an average red value, green value, and blue value of the partial area in the window are expressed in the histogram.

4. The method of claim 3, wherein, the average red value, green value, and blue value of the partial area in the window are expressed at their corresponding positions in the histogram.

5. The method of claim 1, further comprising generating a message if a difference between the average brightness value of the partial area in the window and a set average brightness value exceeds a set upper limit value.

6. The method of claim 1, wherein, in the displaying of the histogram, histograms for brightness, red gradation, green gradation, and blue gradation of the entire displayed image, respectively, are displayed.

7. The method of claim 1, wherein a shape of the window is selected by a user.

8. The method of claim 1, wherein changing the parameters of the window includes parameters selected from the group consisting of moving the window and changing a size of the window.

9. A digital image processing apparatus comprising:
a display; and
a controller that displays a histogram for at least a portion of a displayed image on the display, wherein the controller: displays in a window a partial area of the displayed image;
changes parameters of the window according to a manipulation by the user; and
displays the histogram for the entire displayed image and expresses in the histogram an average brightness value of the partial area in the window.

10. The apparatus of claim 9, wherein, in the displaying of the histogram, the average brightness value of the partial area in the window is expressed as a position in the histogram.

11. The apparatus of claim 9, wherein, in the displaying of the histogram, an average red value, green value, and blue value of the partial area in the window are expressed in the histogram.

12. The apparatus of claim 11, wherein, the average red value, green value, and blue value of the partial area in the window are expressed at their corresponding positions in the histogram.

13. The apparatus of claim 9, wherein the controller further generates a message if a difference between the average brightness value of the partial area in the window and a set average brightness value exceeds a set upper limit value.

14. The apparatus of claim 9, wherein, in the displaying of the histogram, histograms for brightness, red gradation, green gradation, and blue gradation of the entire displayed image, respectively, are displayed.

15. A method of controlling a digital image processing apparatus that displays a histogram for at least a portion of a displayed image, the method comprising:
enclosing a partial area of the displayed image inside a perimeter of a shape;
changing the size of the perimeter of the shape according to a manipulation by the user; and
displaying the histogram for the entire displayed image and expressing an average brightness value in the histogram for the selected partial area enclosed within the perimeter of the shape.

16. The method of claim 15, wherein, in the displaying of the histogram, the average brightness value of the partial area inside the perimeter of the shape is expressed as a position in the histogram.

17. The method of claim 15, wherein, in the displaying of the histogram, an average red value, green value, and blue value of the partial area, inside the perimeter of the shape, are expressed in the histogram.

18. The method of claim 17, wherein, the average red value, green value, and blue value of the partial area, inside the perimeter of the shape, are expressed at their corresponding positions in the histogram.

19. The method of claim 15, wherein, the shape is approximately circular.

20. The method of claim 15, wherein, the displayed histogram overlaps a part of the displayed image.

* * * * *